(12) United States Patent
Lin et al.

(10) Patent No.: US 11,687,202 B2
(45) Date of Patent: Jun. 27, 2023

(54) DRIVING CIRCUIT AND DRIVING METHOD

(71) Applicant: TPK Touch Solutions (Xiamen) Inc., Fujian (CN)

(72) Inventors: Ming-Chuan Lin, Taichung (TW); Wen-Hung Wang, Taichung (TW); Chuan-Chih Fu, Taichung (TW)

(73) Assignee: TPK Touch Solutions (Xiamen) Inc., Fujian (CN)

( * ) Notice: Subject to any disclaimer, the term of this patent is extended or adjusted under 35 U.S.C. 154(b) by 174 days.

(21) Appl. No.: 17/388,130

(22) Filed: Jul. 29, 2021

(65) Prior Publication Data

US 2023/0030770 A1     Feb. 2, 2023

(51) Int. Cl.
*G06F 3/041*     (2006.01)
*G06F 3/044*     (2006.01)

(52) U.S. Cl.
CPC .......... *G06F 3/0446* (2019.05); *G06F 3/0412* (2013.01); *G06F 3/04164* (2019.05); *G06F 3/04166* (2019.05)

(58) Field of Classification Search
None
See application file for complete search history.

(56) References Cited

U.S. PATENT DOCUMENTS

2008/0251299 A1\* 10/2008 Liao ..................... H03K 17/962
                                                                  178/18.06
2010/0177058 A1\* 7/2010 Lin ....................... H03K 17/955
                                                                       345/174

FOREIGN PATENT DOCUMENTS

CN            105867691 A  *  8/2016   ........... G06F 3/0412

\* cited by examiner

*Primary Examiner* — Krishna P Neupane
(74) *Attorney, Agent, or Firm* — Cooper Legal Group, LLC

(57) ABSTRACT

A driving circuit includes at least one light-emitting element, a drive line, a data line, a touch sensor, and a read line. The drive line is electrically coupled to a first terminal of the at least one light-emitting element. The data line is electrically coupled to a second terminal of the at least one light-emitting element. The drive line is electrically coupled to a first terminal of the touch sensor. The read line is electrically coupled to a second terminal of the touch sensor. The read line is electrically isolated from the data line.

16 Claims, 8 Drawing Sheets

DRIVING CIRCUIT AND DRIVING METHOD

BACKGROUND

Field of Disclosure

The present disclosure relates to a driving circuit. More particularly, the present disclosure relates to a driving circuit with touch sensing element.

Description of Related Art

Nowadays, with the popularity of touch panels, the touch display device has become thinner and lighter to provide better experiences for user. However, as the touch display device becomes thinner and lighter, the space of the touch display device for disposing circuitry decreases, and the requirement for sensing accuracy increases. Therefore, how to decrease the space for disposing the wires and pins in the touch display device and providing a better sensing experience are important issues in this technical field.

SUMMARY

An aspect of the present disclosure is to provide a driving circuit including at least one light emitting element, a drive line, a data line, a touch sensor, and a read line. The drive line is electrically coupled to a first terminal of the at least one light emitting element. The data line is electrically coupled to a second terminal of the at least one light emitting element. The drive line is electrically coupled to a first terminal of the touch sensor. The read line is electrically coupled to a second terminal of the touch sensor. The read line is electrically isolated from the data line.

Another aspect of the present disclosure is to provide a driving method for operating a driving circuit. The driving circuit includes at least one light emitting element and a touch sensor. A first terminal of the at least one light emitting element is electrically coupled to a first terminal of the touch sensor. A second terminal of the at least one light emitting element is electrically isolated from a second terminal of the touch sensor. The driving method includes the following steps. During an emission period, providing a drive signal to the first terminal of the at least one light emitting element and the first terminal of the touch sensor to drive the at least one light emitting element and charge the touch sensor. During a sensing period, receiving a sensing signal from the second terminal of the touch sensor, wherein the emission period overlaps the sensing period.

The other aspect of the present disclosure is to provide a driving method for operating a driving circuit. The driving circuit includes at least one light emitting element and a touch sensor. A first terminal of the at least one light emitting element is electrically coupled to a first terminal of the touch sensor. A second terminal of the at least one light emitting element is electrically isolated from a second terminal of the touch sensor. The driving method includes the following steps. During an emission period, providing a drive signal to the first terminal of the at least one light emitting element and the first terminal of the touch sensor to drive the at least one light emitting element and charge the touch sensor. During a sensing period, receiving a sensing signal from the second terminal of the touch sensor. During a reset period, providing a reset signal to the second terminal of the touch sensor to reset voltage level of the touch sensor.

The other aspect of the present disclosure is to provide a driving circuit including at least one first light emitting element, at least one second light emitting element, at least one third light emitting element, a plurality of drive lines, a plurality of data lines, and a plurality of first electrodes. The plurality of drive lines includes a first drive line electrically coupled to a first terminal of the at least one first light emitting element, a second drive line electrically coupled to a first terminal of the at least second first light emitting element, and a third drive line electrically coupled to a first terminal of the at least third first light emitting element. The plurality of data lines are electrically coupled to a second terminal of the at least one first light emitting element, a second terminal of the at least one second light emitting element, and a second terminal of the at least one third light emitting element, respectively. The first drive line is electrically coupled to a first one of the first electrodes, the second drive line is electrically coupled to a second one of the first electrodes, and the third drive line is electrically coupled to a third one of the first electrodes.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
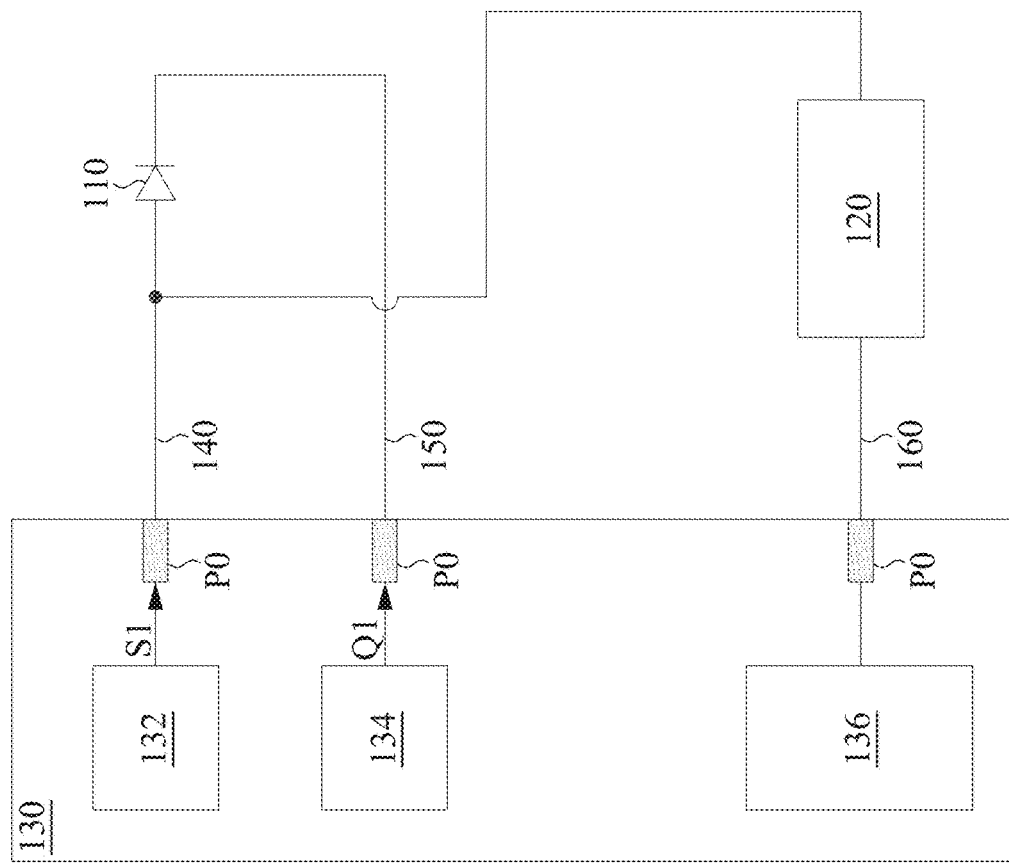
FIG. 1 is a schematic diagram of a driving circuit in an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a schematic diagram of a driving circuit 100 in an embodiment of the present disclosure. As shown in FIG. 1, the driving circuit 100 includes at least one light emitting element 110, a touch sensor 120, a control circuit 130, a drive line 140, a data line 150, and a read line 160. The control circuit 130 includes a scanning module 132, an output module 134, a read module 136, and multiples of pins P0.

In some embodiments, the at least one light emitting element 110 can be implemented by a micro light emitting diode, a mini light emitting diode, a light emitting diode, or other light emitting elements.

In structure, the drive line 140 is electrically coupled to a first terminal of the at least one light emitting element 110 and a first terminal of the touch sensor 120, and the drive line 140 is electrically coupled to the scanning module 132 through the pin P0. The scanning module 132 provides a driving signal S1 to the drive line 140 to drive the at least one light emitting element 110 and charge the touch sensor 120.

It is to be noted that, since the scanning module 132 is electrically coupled to the at least one light emitting element 110 and the touch sensor 120 through the drive line 140, the scanning module 132 will provide the driving signal S1 to the at least one light emitting element 110 and the touch sensor 120, simultaneously. Additional detail describing how the at least one light emitting element 110 is driven and the touch sensor 120 is charged at same time will be described in the following embodiments.

The data line 150 is electrically coupled to a second terminal of the at least one light emitting element 110, and the data line 150 is electrically coupled to the output module 134 through the pin P0. The output module 134 provides a data signal Q1 to the data line 150 to control the brightness of the at least one light emitting element 110.

The read line 160 is electrically coupled to a second terminal of the touch sensor 120, and the read line 160 is electrically coupled to the read module 136 through the pin P0. The read module 136 is configured to read a sensing signal of the touch sensor 120.

Figure 2:
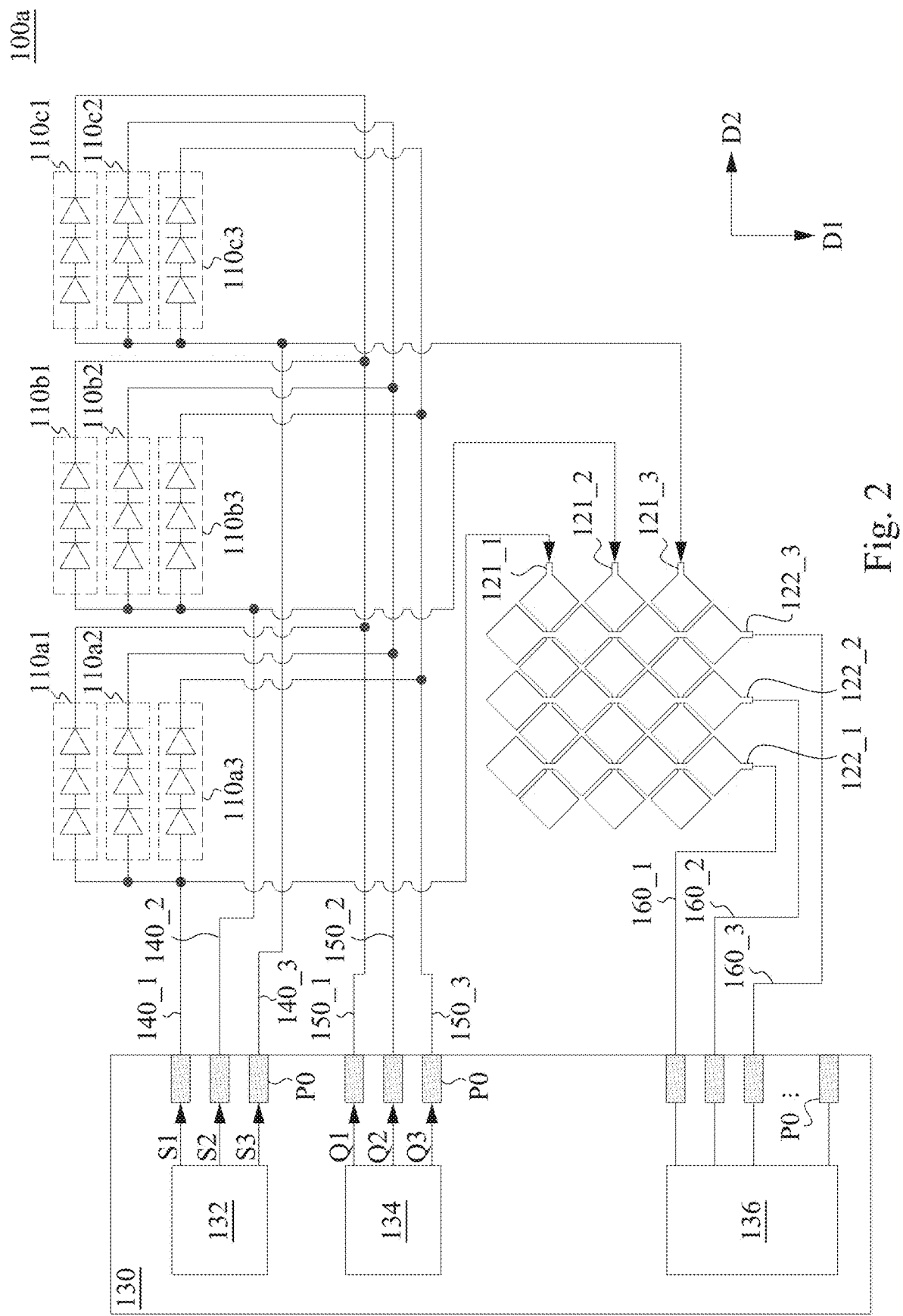
FIG. 2 is a schematic diagram of a driving circuit in an embodiment of the present disclosure.

Reference is made to FIG. 2. FIG. 2 is a schematic diagram of a driving circuit 100*a* in an embodiment of the present disclosure. As shown in FIG. 2, the driving circuit 100*a* includes a plurality of light emitting elements 110*a*1-110*a*3, 110*b*1-110*b*3, and 110*c*1-110*c*3, a control circuit 130, drive lines 140_1-140_3, data lines 150_1-150_3, and read lines 160_1-160_3. The control circuit 130 includes a scanning module 132, an output module 134, a read module 136, and multiples of pins P0.

In the embodiment of FIG. 2, the plurality of light emitting elements 110*a*1-110*a*3, 110*b*1-110*b*3, and 110*c*1-110*c*3 can be implemented by three light emitting elements coupled in series. In other embodiments, the plurality of light emitting elements 110*a*1-110*a*3, 110*b*1-110*b*3, and 110*c*1-110*c*3 can be implemented by one, two, four, six, or another number of light emitting elements. The aforesaid light emitting elements can be implemented by micro light emitting diodes, mini light emitting diodes, light emitting diodes, or other light emitting elements.

In the embodiment of FIG. 2, the number of first electrodes 121_1-121_3 and second electrodes 122_1-122_3 and the corresponding number of drive lines 140_1-140_3, the data lines 150_1-150_3, and the read lines 160_1-160_3 are examples. In other embodiments, the driving circuit 100*a* may include more first electrodes, second electrodes, drive lines, data lines, and read lines. Therefore, the number of first electrodes, second electrodes, drive lines, data lines, and read lines in the illustrated embodiment is not intend to limit the present disclosure.

It is to be noted that the touch sensor 120 in FIG. 1 can be implemented by any of the first electrodes 121_1-121_3 and any of the second electrodes 122_1-122_3 in FIG. 2. In a visual area, the first electrodes 121_1-121_3 and the second electrodes 122_1-122_3 are electrically isolated from each other. Additionally the first electrodes 121_1-121_3 and the second electrodes 122_1-122_3 can be considered as in mutual capacitance so as to define a mutual capacitance touch sensor. The first electrodes 121_1-121_3 extend along a second direction D2, and the first electrodes 121_1-121_3 are arranged along a first direction D1. The second electrodes 122_1-122_3 extend along the first direction D1 and the second electrodes 122_1-122_3 are arranged along the second direction D2. Each of the first electrodes 121_1-121_3 includes multiple first electrode units coupled in series along the second direction D2. Each of the second electrodes 122_1-122_3 includes multiple second electrode units coupled in series along the first direction D1. In some embodiments, the first electrode units and the second electrode units can be rhombus shaped. However, the first electrode units and the second electrode units can be other shapes, and the shape of the first electrode units and the second electrode units in the illustrated embodiment is not intended to limit the present disclosure. The first electrodes 121_1-121_3 and the second electrodes 122_1-122_3 can be implemented by a metal material (e.g., molybdenum aluminum alloy, copper, silver, titanium, etc.) or a transparent conductive material (e.g., indium tin oxide, zinc oxide, graphene, etc.)

In structure, the drive line 140_1 is electrically coupled to first terminals of the light emitting elements 110*a*1-110*a*3 and a terminal of the first electrode 121_1, and the drive line 140_1 is electrically coupled to the scanning module 132 through the pin P0. The scanning module 132 provides a driving signal S1 to the drive line 140_1 to drive the light emitting elements 110*a*1-110*a*3 and charge the first electrode 121_1.

The drive line 140_2 is electrically coupled to first terminals of the light emitting elements 110*b*1-110*b*3 and a terminal of the first electrode 121_2, and the drive line 140_2 is electrically coupled to the scanning module 132 through the pin P0. The scanning module 132 provides a driving signal S2 to the drive line 140_2 to drive the light emitting elements 110*b*1-110*b*3 and charge the first electrode 121_2.

The drive line 140_3 is electrically coupled to first terminals of the light emitting elements 110*c*1-110*c*3 and a terminal of the first electrode 121_3, and the drive line 140_3 is electrically coupled to the scanning module 132 through the pin P0. The scanning module 132 provides a driving signal S3 to the drive line 140_3 to drive the light emitting elements 110*c*1-110*c*3 and charge the first electrode 121_3.

The data line 150_1 is electrically coupled to second terminals of the light emitting elements 110*a*1, 110*b*1, and 110*c*1, and the data line 150_1 is electrically coupled to the output module 134 through the pin P0. The data line 150_2 is electrically coupled to second terminals of the light emitting elements 110*a*2, 110*b*2, and 110*c*2, and the data line 150_2 is electrically coupled to the output module 134 through the pin P0. The data line 150_3 is electrically coupled to second terminals of the light emitting elements 110*a*3, 110*b*3, and 110*c*3, and the data line 150_3 is electrically coupled to the output module 134 through the pin P0. The output module 134 respectively provides data signals Q1-Q3 to the data lines 150_1-150_3, so as to control the brightness of the light emitting elements 110*a*1-110*a*3, 110*b*1-110*b*3, or 110*c*1-110*c*3.

The read lines 160_1-160_3 and the data lines 150_1-150_3 are electrically isolated from each other. The read lines 160_1-160_3 are electrically coupled to terminals of the second electrodes 122_1-122_3, respectively, and the read lines 160_1-160_3 are electrically coupled to the read module 136 through the pins P0, respectively. The read module 136 is configured to read sensing signals of the second electrodes 122_1-122_3.

Figure 3:
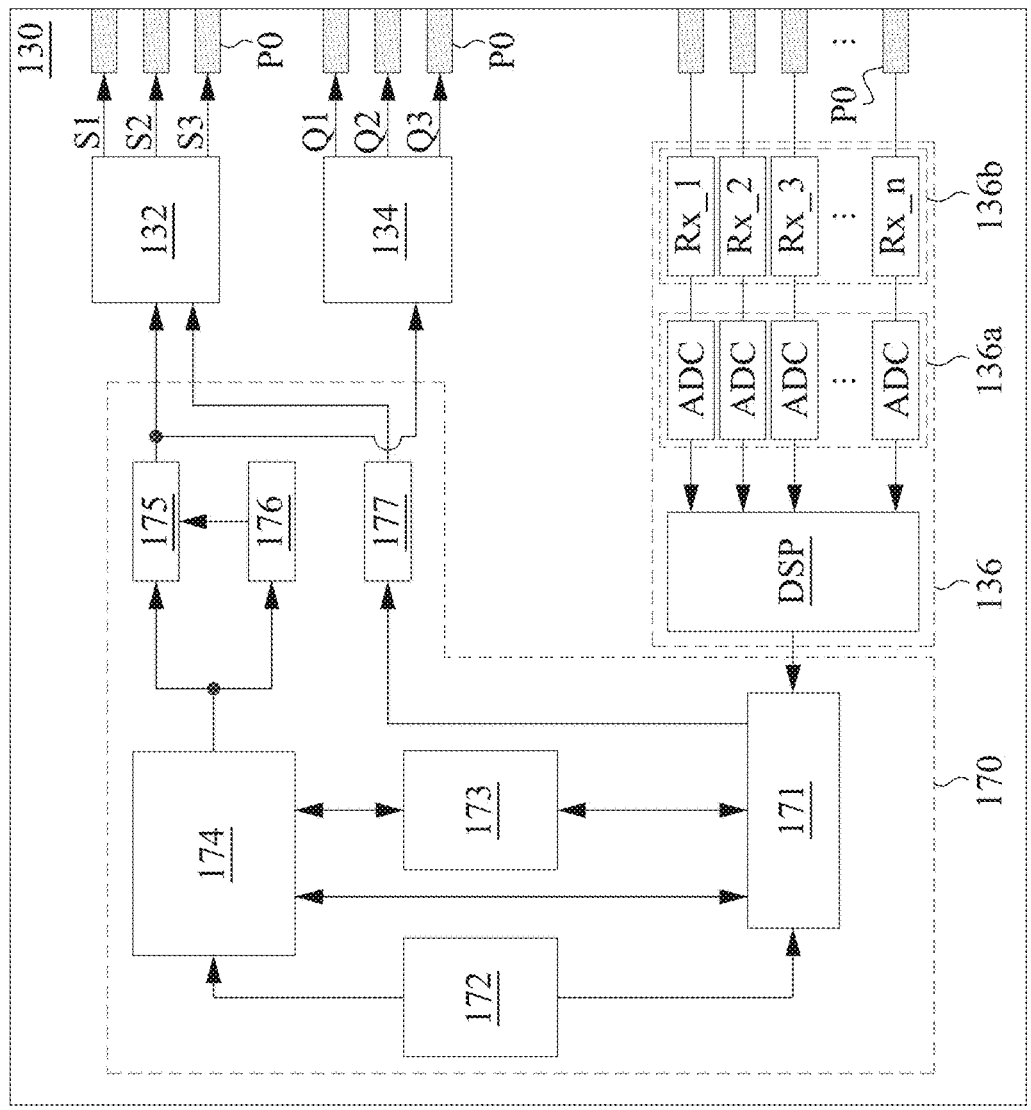
FIG. 3 is a block diagram of a driving circuit in an embodiment of the present disclosure.

For better understanding of how the control circuit 130 reads the sensing signals, reference is made to FIG. 2 and FIG. 3. FIG. 3 is a block diagram of a driving circuit 100*a* in an embodiment of the present disclosure. As shown in FIG. 3, the control circuit 130 includes a scanning module 132, an output module 134, and a read module 136. The scanning module 132 configured to provide driving signals S1-S3. The output module 134 is configured to provide data signals Q1-Q3.

The read module 136 includes a digital signal processor DSP, an analog-to-digital converter (ADC) circuit 136*a*, and a read circuit 136*b*. The ADC circuit 136*a* includes multiple ADC converters ADC. The read circuit 136*b* includes read units Rx_1-Rx_n. The read units Rx_1-Rx_n are electrically coupled to ADC converters ADC, respectively. The second electrodes 122_1-122_3 are electrically coupled to the read units Rx_1-Rx_3 through multiple pins P0.

In some embodiments, each read unit Rx_1-Rx_3 can be implemented by at least one switch. The at least one switch can be controlled to turn on or turn off by receiving and determining the logic level of the enable signal, so as to read the sensing signals from the second electrodes 122_1-122_3.

In some embodiments, the control circuit 130 further includes the control module 170. The control module 170 includes a touch process unit 171, an interface module 172, a memory module 173, a data and timing process module 174, a light emitting element driving module 175, a light emitting element control module 176, and a touch driving module 177. As shown in FIG. 3, the touch process unit 171 can store the sensing signals received from the read module 136 in the memory module 173, and the touch process unit 171 can control the data and timing process module 174 and the touch driving module 177 through the interface module 172 according to the sensing signals. The touch driving module 177 is configured to control the scanning module 132. The data and timing process module 174 is configured to control the light emitting element driving module 175 and the light emitting element control module 176. The light emitting element driving module 175 is configured to control the scanning module 132 and the output module 134.

In some embodiments, the control module 170 can control a scan rate of the scanning module 132 according to the sensing signals received from the second electrodes 122_1-122_3 by the read module 136, so as to cooperate with the user's operation manner to provide a better experience for touch sensing.

Figure 4:
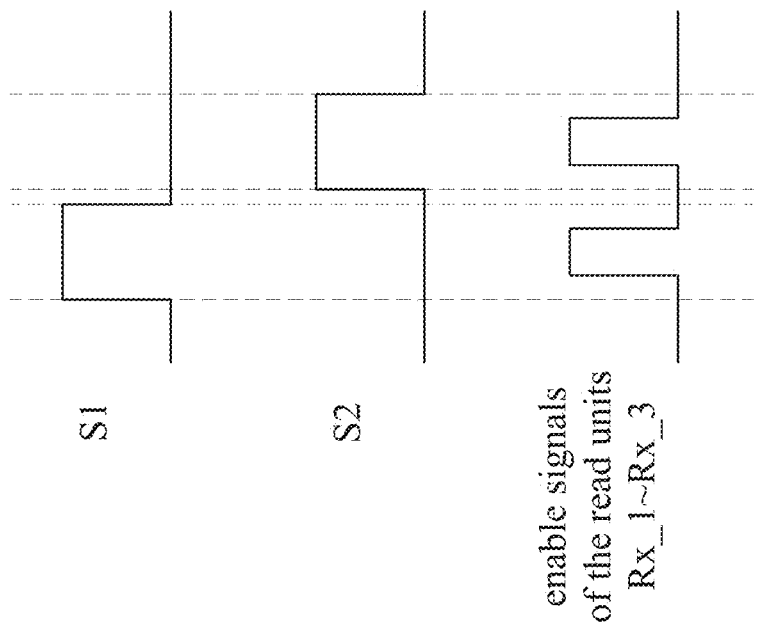
FIG. 4 is a timing diagram of signals of the driving circuit of FIG. 2 in an embodiment of the present disclosure.

Reference is made to FIG. 2, FIG. 3, and FIG. 4. FIG. 4 is a timing diagram of signals of the driving circuit 100*a* of FIG. 2 in an embodiment of present disclosure. As shown in FIG. 4, while the driving signal S1 is at a high logic level and the driving signals S2 and S3 (not shown) are at a low logic level, the driving signal S1 is transmitted from the scanning module 132 through the drive line 140_1 to the light emitting elements 110*a*1-110*a*3 and the first electrode 121_1, such that the light emitting elements 110*a*1-110*a*3 emit light and the first electrode 121_1 is charged simultaneously while the driving signal S1 is at the high logic level. Meanwhile, if a user's finger (or external object, not shown) touches or is close to the touch sensor 120, causing enable signals received by the read units Rx_1-Rx_3 to be logical high, the sensing signals can be received through an electrical current path from the read lines 160_1-160_3 to the read module 136.

In some embodiments, the pulse width of the driving signal can be considered an the emission period of the light emitting elements 110*a*1-110*a*3, and the enable signals at a high logic level can be considered as sensing periods of the read units Rx_1-Rx_3. It is to be noted that, in the embodiment of FIG. 2, the sensing period overlaps the period during which the enable signals are logical high, and the sensing period can shorter than the period during which the enable signals are logical high, such that the sensing period does not overlap a rising edge and a falling edge of the driving signal. As a result, the sensing signal will not be affected by pull-up and pull-down of the driving signal pulse.

Figure 5:
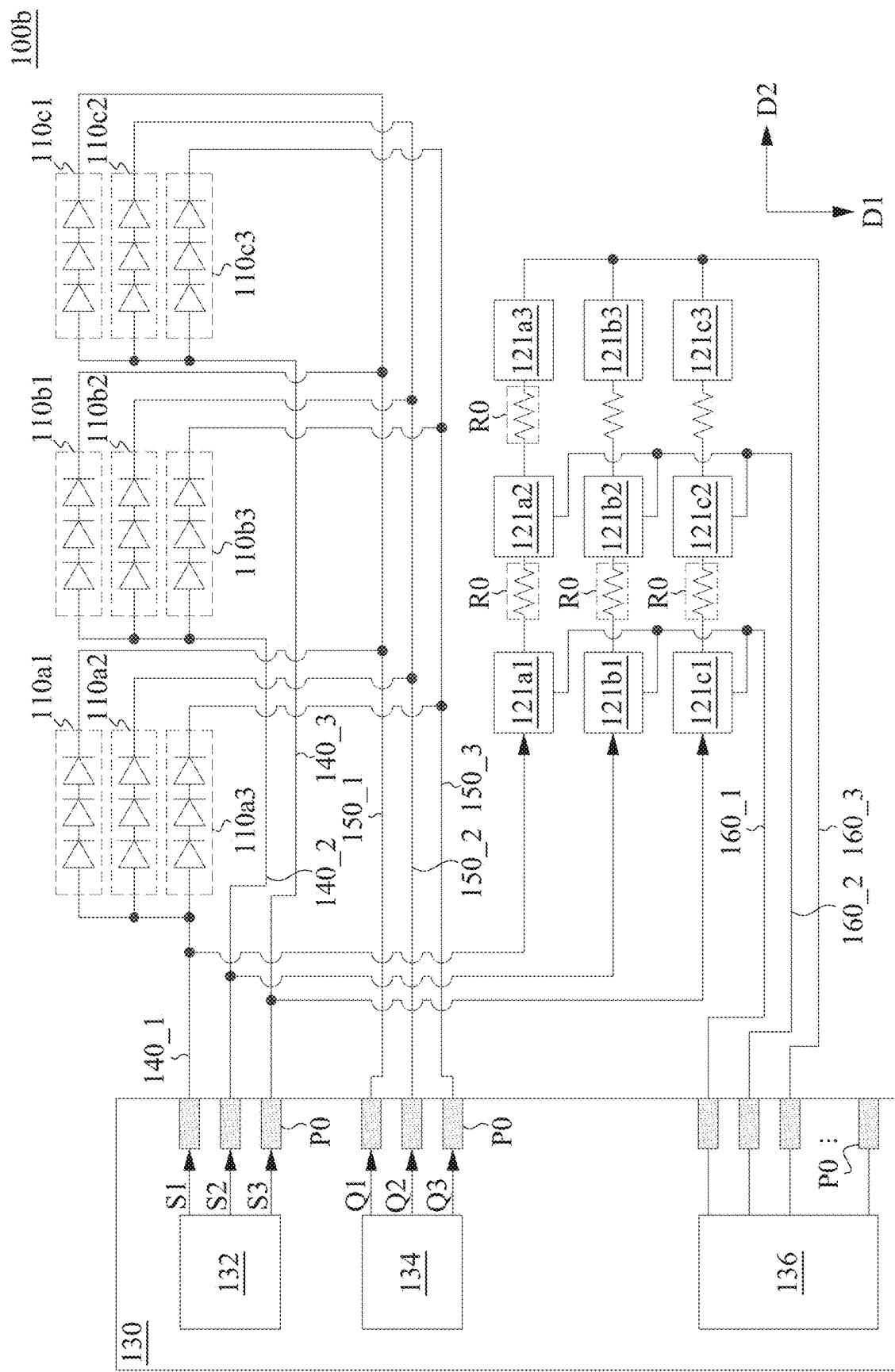
FIG. 5 is a block diagram of a driving circuit in an embodiment of the present disclosure.

Reference is made to FIG. 5. FIG. 5 is a block diagram of a driving circuit 100*b* in an embodiment of the present disclosure. The driving circuit 100*b* includes light emitting elements 110*a*1-110*a*3, 110*b*1-110*b*3, and 110*c*1-110*c*3, a control circuit 130, drive lines 140_1-140_3, data lines 150_1-150_3, read lines 160_1-160_3, and first electrode 121*a*1-121*a*3, 121*b*1-121*b*3, and 121*c*1-121*c*3. The control circuit 130 includes a scanning module 132, an output module 134, a read module 136, and multiple of the pins P0.

The touch sensor 120 in the embodiment of FIG. 1 can be implemented by each of the first electrodes 121*a*1-121*a*3, 121*b*1-121*b*3, and 121*c*1-121*c*3 in the embodiment of FIG. 5.

Compared to the driving circuit 100*a* in the embodiment of FIG. 2, the driving circuit 100*b* in the embodiment of FIG. 5 is different in that the first electrodes of the driving circuit 100*b* are self-capacitance touch sensors instead of the mutual capacitance touch sensors. Therefore, the driving circuit 100*b* includes the first electrodes 121*a*1-121*a*3, 121*b*1-121*b*3, and 121*c*1-121*c*3 but not the second electrodes in the embodiment of FIG. 2. The first electrodes 121*a*1-121*a*3, 121*b*1-121*b*3, and 121*c*1-121*c*3 can be implemented by a metal material (e.g., molybdenum aluminum alloy, copper, silver, titanium, etc.) or a transparent conductive material (e.g., indium tin oxide, zinc oxide, graphene, etc.)

In structure, the first electrodes 121*a*1-121*a*3 are coupled to each other in series along the second direction D2. The first electrodes 121*b*1-121*b*3 are coupled to each other in series along the second direction D2. The first electrodes 121*c*1-121*c*3 are coupled to each other in series along the second direction D2.

The drive line 140_1 is electrically coupled to first terminals of the light emitting elements 110*a*1-110*a*3 and a first terminal of the first electrode 121*a*1, and the drive line 140_1 is electrically coupled to the scanning module 132 through a pin P0. The scanning module 132 provides a driving signal S1 to the drive line 140_1, so as to drive the light emitting elements 110 *a*1-110*a*3 and charge the first electrodes 121*a*1-121*a*3.

The drive line 140_2 is electrically coupled to first terminals of the light emitting elements 110*b*1-110*b*3 and a first terminal of the first electrode 121*b*1, and the drive line 140_2 is electrically coupled to the scanning module 132 through a pin P0. The scanning module 132 provides a driving signal S1 to the drive line 140_2, so as to drive the light emitting elements 110*b*1-110*b*3 and charge the first electrodes 121*b*1-121*b*3.

The drive line 140_3 is electrically coupled to first terminals of the light emitting elements 110*c*1-110*c*3 and a first terminal of the first electrode 121*c*1, and the drive line 140_3 is electrically coupled to the scanning module 132 through a pin P0. The scanning module 132 provides a driving signal S1 to the drive line 140_3, so as to drive the light emitting elements 110*c*1-110*c*3 and charge the first electrodes 121*c*1-121*c*3.

The data line 150_1 is electrically coupled to second terminals of the light emitting elements 110*a*1, 110*b*1, and 110*c*1, and the data line 150_1 is electrically coupled to the output module 134 through the pin P0. The output module 134 respectively provides the data signals Q1-Q3 to the data lines 150_1-150_, so as to control the brightness of the light emitting elements 110a1-110a3, 110b1-110b3, or 110c1-110c3.

The read line 160_1 is electrically coupled to the first electrodes 121a1, 121b1, and 121c1. The read line 160_1 is configured to receive sensing signals from the first electrodes 121a1, 121b1, or 121c1. The read line 160_2 is electrically coupled to the first electrodes 121a2, 121b2, and 121c2. The read line 160_2 is configured to receive sensing signals from the first electrodes 121a2, 121b2, or 121c2. The read line 160_3 is electrically coupled to the first electrodes 121a3, 121b3, and 121c3. The read line 160_3 is configured to receive sensing signals from the first electrodes 121a3, 121b3, or 121c3.

It is to be noted that multiple resistors RO are coupled between the first electrodes. For example, one resistor RO is coupled between the first electrodes 121a1 and 121a2, another resistor RO is coupled between the first electrodes 121a2 and 121a3, another resistor RO is coupled between the first electrodes 121c1 and 121c2. In some embodiments, the resistors RO can have a high resistance value. In this case, when a user's finger (or external object, not shown) touches or is close to the touch sensor 120, the location of the touch position will not be misjudged after the logic level of the enable signals transmitted to the read units Rx_1-Rx_n are received and determined.

The other detailed connection relationships in the driving circuit 100b are substantially the same as the driving circuit 100a in the previous embodiment in FIG. 2. In addition, the control circuit 130 in the driving circuit 100b can also be implemented by the control circuit 130 in FIG. 3, and thus the explanation is omitted.

Figure 6:
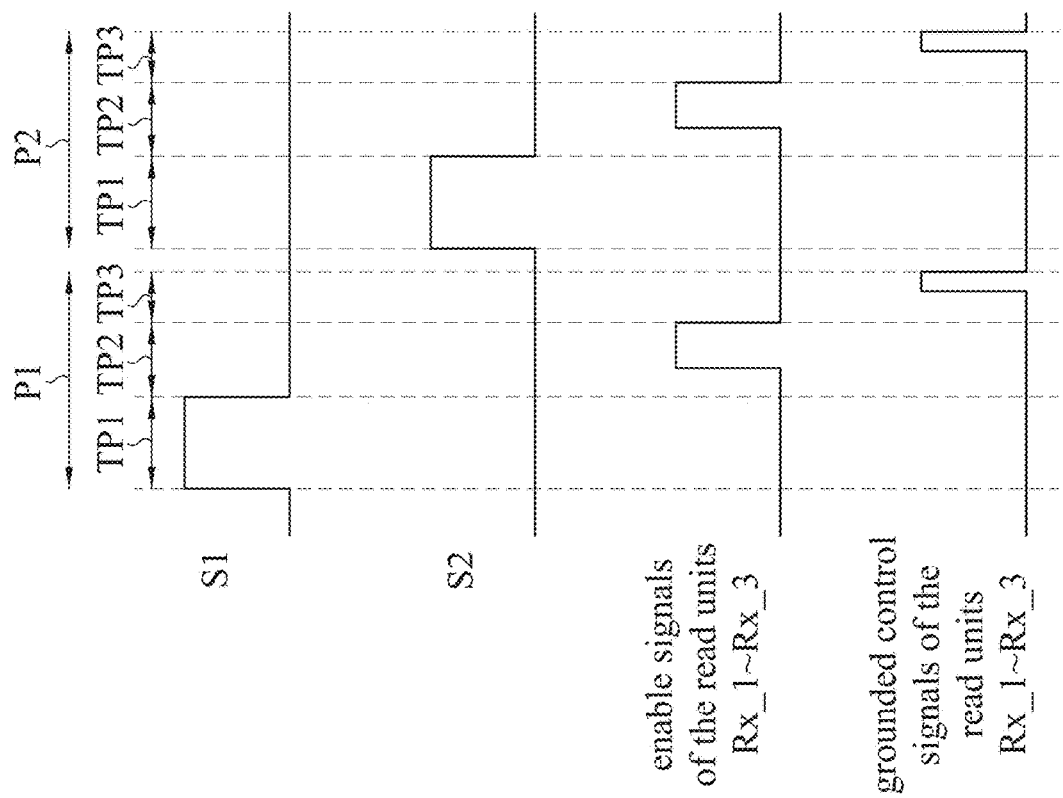
FIG. 6 is a timing diagram of signals of the driving circuit of FIG. 5 in an embodiment of the present disclosure.

Reference is made to FIG. 3, FIG. 5, and FIG. 6. FIG. 6 is a timing diagram of signals of the driving circuit 100b of FIG. 5 in an embodiment of the present disclosure. As shown in FIG. 6, the time periods P1 and P2 of the driving circuit 100b can be divided into the scanning period TP1 (that is, the period that the light-emitting elements receive the drive signals and emit light), the sensing period TP2, and the reset period TP3. In addition, the scanning period TP1 (light emitting period) does not overlap the sensing period TP2.

In the scanning period TP1 of the time period P1 (that is, the period that the light-emitting elements receive the drive signals and emit light), the driving signal S1 is logical high, the driving signal S2 is logical low, and enable signals and grounded control signals are logical low. In this case, the driving signal S1 is transmitted to the light emitting elements 110a1-110a3 and the first electrodes 121_a1-121_a3 from the scanning module 132 through the drive line 140_1, so as to drive the light emitting elements 110a1-110a3 and charge the first electrodes 121_a1-121_a3.

In the sensing period TP2 of the time period P1, if a user's finger (or external object, not shown) touches or is close to the touch sensor 120, causing enable signals received by the read units Rx_1-Rx_3 to be logical high, the sensing signals from the first electrodes 121_a1-121_a3 can be received through an electrical current path from the read lines 160_1-160_3 to the read module 136.

In the reset period TP3 of the time period P1, the read units Rx_1-Rx_3 are grounded by a grounded control signal (reset signals). That is, the electrical current path from the read lines 160_1-160_3 to the ground (not shown) is conductive, so as to reset the voltage level of the first electrodes 121_a1-121_a3.

Figure 7:
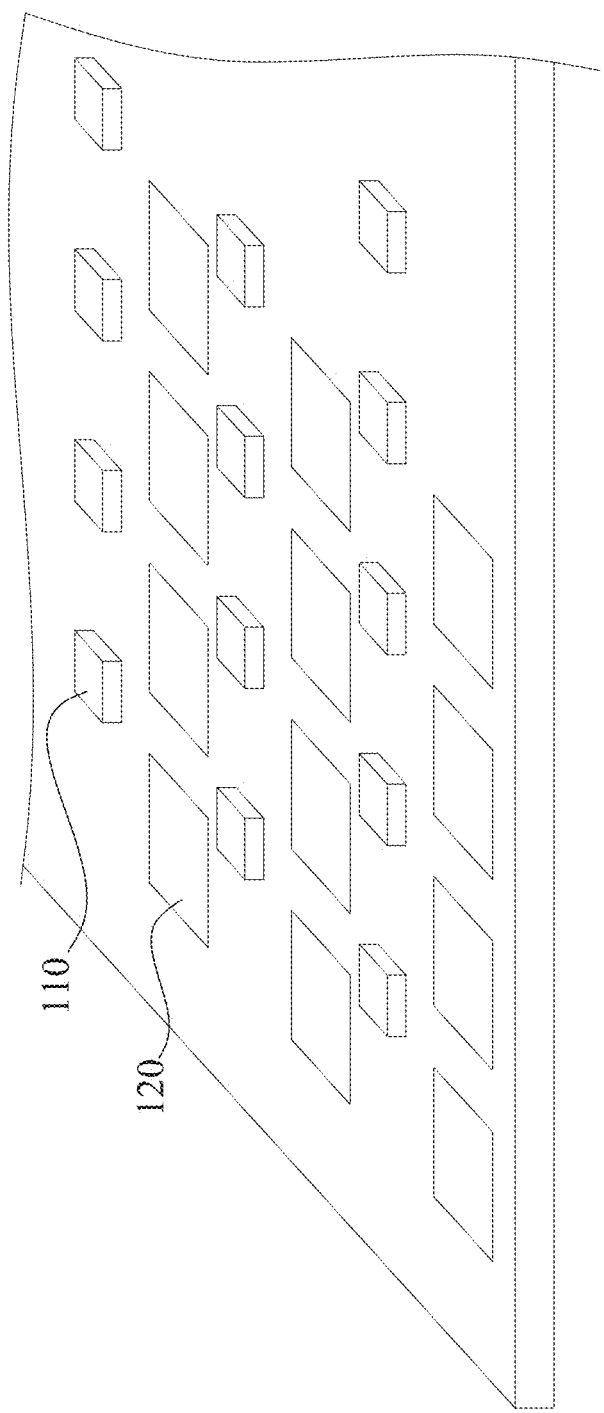
FIG. 7 and FIG. 8 are schematic diagrams of a light board for light emitting elements in an embodiment of the present disclosure.
Figure 8:
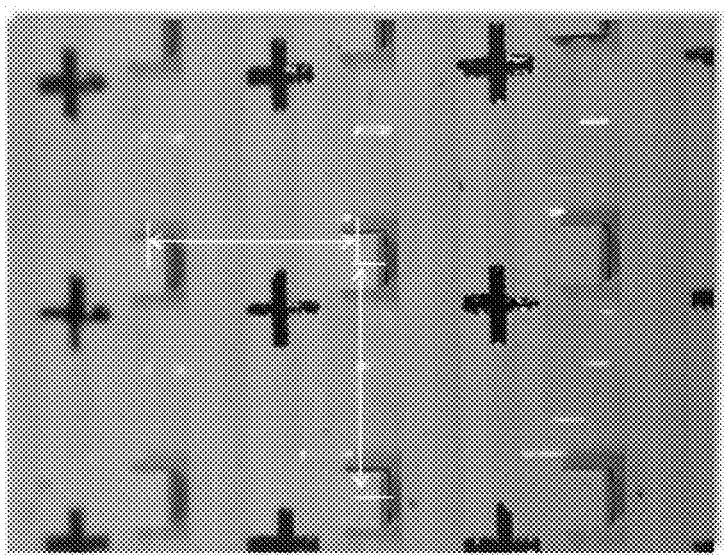

Reference is made to FIG. 7 and FIG. 8. FIG. 7 and FIG. 8 are schematic diagrams of a light board for light emitting elements in an embodiment of the present disclosure. In some embodiments, multiple of the light emitting elements 110 are disposed on the light board, and a distance between each light emitting element 110 is 2-10 mm. Therefore, the space between the light emitting elements 110 can arrange multiple of touch sensors 120.

Summary, the driving circuit 100, 100a, and 100b in the present disclosure integrate the at least one light emitting element 110 and the drive line 140 of the touch sensor 120, in order to reduce the circuit area and reduce the number of pins of the control circuit 130. In additional, the high current pulse of the driving signal can charge the touch sensor 120 faster. Furthermore, the emission period of the at least one light emitting element 110 and the sensing period of the touch sensor 120 is controlled to reduce the signal interference of the sensing signals received from the touch sensor 120 caused by the emission of the at least one light emitting element 110. Accordingly, the accuracy of touch sensing is improved.

Although specific embodiments of the disclosure have been disclosed with reference to the above embodiments, these embodiments are not intended to limit the disclosure. Various alterations and modifications may be performed on the disclosure by those of ordinary skill in the art without departing from the principle and spirit of the disclosure. Thus, the protective scope of the disclosure shall be defined by the appended claims.

What is claimed is:
1. A driving circuit, comprising:
at least one light emitting element;
a drive line electrically coupled to a first terminal of the at least one light emitting element;
a data line electrically coupled to a second terminal of the at least one light emitting element;
a touch sensor, wherein the drive line is electrically coupled to a first terminal of the touch sensor; and
a read line electrically coupled to a second terminal of the touch sensor, wherein the read line is electrically isolated from the data line.

2. The driving circuit of claim 1, wherein the touch sensor comprises:
a first electrode arranged along a first direction and electrically coupled to the drive line; and
a second electrode arranged along a second direction and electrically coupled to the data line, wherein the first direction is different from the second direction;
wherein,
in a visual area, the first electrode is electrically isolated from the second electrode.

3. The driving circuit of claim 2, further comprising a control circuit electrically coupled to the drive line and the read line, wherein the control circuit is configured to:
during an emission period, provide a drive signal to the drive line, wherein the drive signal drives the at least one light emitting element and charges the touch sensor through the drive line simultaneously; and
during a sensing period, receive a sensing signal through the read line from the touch sensor, wherein the emission period overlaps the sensing period.

4. The driving circuit of claim 3, wherein the control circuit is electrically coupled to the data line, and the control circuit is further configured to:
providing a data signal to the at least one light emitting element through the data line, such that the at least one light emitting element emits light according to the data signal and the drive signal during the emission period.

5. The driving circuit of claim 3, wherein the sensing period is shorter than the emission period, wherein the emission period is equal to a pulse width of the drive signal, and wherein the sensing period does not overlap a rising edge and a falling edge of the drive signal.

6. The driving circuit of claim 1, wherein the touch sensor comprises:
a first electrode with a first terminal electrically coupled to the drive line and a second terminal electrically to the read line.

7. The driving circuit of claim 6, wherein the driving circuit sequentially operates in an emission period, a sensing period, and a reset period, and the driving circuit further comprises a control circuit, wherein the control circuit is configured to:
during the emission period, provide a drive signal to the drive line to drive the at least one light emitting element and charge the touch sensor;
during the sensing period, receive a sensing signal along the read line from the touch sensor; and
during the reset period, provide a reset signal along the read line to the touch sensor to reset a voltage level of the touch sensor.

8. A driving method for operating a driving circuit, wherein the driving circuit comprises at least one light emitting element and a touch sensor, wherein a first terminal of the at least one light emitting element is electrically coupled to a first terminal of the touch sensor, wherein a second terminal of the at least one light emitting element is electrically isolated from a second terminal of the touch sensor, and wherein the driving method comprises:
during an emission period, providing a drive signal to the first terminal of the at least one light emitting element and the first terminal of the touch sensor to drive the at least one light emitting element and charge the touch sensor; and
during a sensing period, receiving a sensing signal from the second terminal of the touch sensor, wherein the emission period overlaps the sensing period.

9. The driving method of claim 8, wherein the sensing period is shorter than the emission period, wherein the emission period is equal to a pulse width of the drive signal, and wherein the sensing period does not overlap a rising edge and a falling edge of the drive signal.

10. A driving method for operating a driving circuit, wherein the driving circuit comprises at least one light emitting element and a touch sensor, wherein a first terminal of the at least one light emitting element is electrically coupled to a first terminal of the touch sensor, wherein a second terminal of the at least one light emitting element is electrically isolated from a second terminal of the touch sensor, and wherein the driving method comprises:
during an emission period, providing a drive signal to the first terminal of the at least one light emitting element and the first terminal of the touch sensor to drive the at least one light emitting element and charge the touch sensor;
during a sensing period, receiving a sensing signal from the second terminal of the touch sensor; and
during a reset period, providing a reset signal to the second terminal of the touch sensor to reset a voltage level of the touch sensor.

11. The driving method of claim 10, wherein the driving circuit is sequentially operated in the emission period, the sensing period, and the reset period.

12. A driving circuit, comprising:
at least one first light emitting element;
at least one second light emitting element;
at least one third light emitting element;
a plurality of drive lines, comprising a first drive line electrically coupled to a first terminal of the at least one first light emitting element, a second drive line electrically coupled to a first terminal of the at least second first light emitting element, and a third drive line electrically coupled to a first terminal of the at least third first light emitting element;
a plurality of data lines electrically coupled to a second terminal of the at least one first light emitting element, a second terminal of the at least one second light emitting element, and a second terminal of the at least one third light emitting element, respectively; and
a plurality of first electrodes, wherein the first drive line is electrically coupled to a first one of the first electrodes, the second drive line is electrically coupled to a second one of the first electrodes, and the third drive line is electrically coupled to a third one of the first electrodes.

13. The driving circuit of claim 12, further comprising:
a plurality of read lines; and
a plurality of second electrodes electrically coupled to the read lines respectively, wherein the first electrodes are arranged along a first direction, wherein the second electrodes are arranged along a second direction, and wherein the first direction is different from the second direction.

14. The driving circuit of claim 13, further comprising a control circuit, wherein the control circuit is configured to:
during an emission period, provide a drive signal to the first drive line, wherein the drive signal drives the at least one first light emitting element and charges the first one of the first electrodes through the first drive line simultaneously; and
during a sensing period, receive a plurality of sensing signals from the second electrodes, wherein the emission period overlaps the sensing period.

15. The driving circuit of claim 12, further comprising:
a first read line electrically to the first one of the first electrodes, the second one of the first electrodes, and the third one of the first electrodes.

16. The driving circuit of claim 15, further comprising:
a second read line electrically coupled to a fourth one of the first electrodes, a fifth one of the first electrodes, and a sixth one of the first electrodes;
a first resistor electrically coupled between the first one of the first electrodes and the fourth one of the first electrodes;
a second resistor electrically coupled between the second one of the first electrodes and the fifth one of the first electrodes; and
a third resistor electrically coupled between the third one of the first electrodes and the sixth one of the first electrodes.

* * * * *